(12) United States Patent
Zheng et al.

(10) Patent No.: US 8,775,693 B2
(45) Date of Patent: Jul. 8, 2014

(54) SD/SDIO HOST CONTROLLER

(75) Inventors: Yuchi Zheng, Shanghai (CN); Jinxiang Chen, Shanghai (CN)

(73) Assignee: Omnivision Technologies (Shanghai) Co., Ltd., Shanghai (CN)

( * ) Notice: Subject to any disclaimer, the term of this patent is extended or adjusted under 35 U.S.C. 154(b) by 37 days.

(21) Appl. No.: 13/597,201

(22) Filed: Aug. 28, 2012

(65) Prior Publication Data

US 2013/0103862 A1 Apr. 25, 2013

(30) Foreign Application Priority Data

Oct. 20, 2011 (CN) .......................... 2011 1 0321380

(51) Int. Cl.
  *G06F 13/00* (2006.01)
  *G06F 5/00* (2006.01)
  *G06F 13/28* (2006.01)

(52) U.S. Cl.
  USPC ................. 710/22; 710/25; 710/36; 709/212; 711/167; 711/168

(58) Field of Classification Search
  None
  See application file for complete search history.

(56) References Cited

U.S. PATENT DOCUMENTS

| 4,550,292 | A * | 10/1985 | Smith ............................ 331/2 |
| 6,084,442 | A * | 7/2000 | Bayer .......................... 327/107 |
| 8,422,619 | B2 * | 4/2013 | Shibayama .................... 377/48 |
| 2002/0064072 | A1 * | 5/2002 | Ooishi et al. ............. 365/189.05 |
| 2008/0046775 | A1 * | 2/2008 | Chien .......................... 713/500 |
| 2008/0059679 | A1 * | 3/2008 | Zhang et al. .................. 710/301 |
| 2011/0116557 | A1 * | 5/2011 | Agrawal et al. ............... 375/259 |

* cited by examiner

*Primary Examiner* — Michael Sun
(74) *Attorney, Agent, or Firm* — Blakely Sokoloff Taylor & Zafman

(57) ABSTRACT

An SD/SDIO host controller is disclosed, which includes a control register and interrupt generation module, an internal DMA module, an SD/SDIO command interface module, an SD/SDIO data interface module, and a frequency divider and trigger/sampling enable signal generation module which is connected to an output end of the control register and interrupt generation module; the frequency divider and trigger/sampling enable signal generation module employs a frequency divider to perform frequency division on a local high-speed clock so as to obtain the operating clock of the SD/SDIO card, and simultaneously generates a trigger/sampling enable signal by the frequency divider and enables the position of the enable signal to be adjustable with respect to the operating clock of the SD/SDIO card. The present invention is capable of solving the setup/hold time issues caused by delay in digital signals.

6 Claims, 4 Drawing Sheets

SD/SDIO HOST CONTROLLER

CROSS-REFERENCE TO RELATED APPLICATIONS

This application claims the priority of Chinese patent application number 201110321380.5, filed on Oct. 20, 2011, the entire contents of which are incorporated herein by reference.

TECHNICAL FIELD

The present invention relates to a host controller, and more particularly, to an SD/SDIO host controller.

BACKGROUND

The most common practice of the prior art in data signal triggering/sampling is to use a clock returned from a chip pin to trigger/sample the data signal, but this method has three shortcomings as follows:

1) When testing and verifying by using FPGAs (Field-Programmable Gate Array), the stability of timing characteristics can only be guaranteed by employing a trigger using the global clock network, and therefore, if a register is directly triggered by the clock returned from the chip pin, the timing characteristics of the register will not be guaranteed and setup/hold timing violations may occur, which will be reflected as instability during the test.

2) When implementing by using ASICs (Application Specific Integrated Circuit), both signal delay from the register's Q-end to the chip pins and signal delay from the chip pins to the register's D-end must be accurately controlled so as to obtain a satisfying setup/hold time.

3) Sampling locations are not adjustable, leading to the lack of flexibility and the proneness to be limited by a delay in the circuit of the test board.

As shown in FIGS. 1 and 2, Tpd is the sum of the chip internal delay and the test board delay; Tset is the setup time needed for the data receiving end to sample data; and Thold is the hold time needed for the data receiving end to sample data. In FIG. 1, a forward delay of data signal against clock takes up the setup time of the data receiving end, and in FIG. 2, a backward delay of data signal against clock takes up the hold time of the data receiving end. Thus, it is clear that fixed trigger/sampling points will be affected by signal delay.

Currently, SD card (Secure Digital Memory Card) and SDIO card (Secure Digital Input and Output Card) have been widely used in handheld devices, and there are many designs for the host controller of an SD/SDIO card. However, as trigger/sampling points cannot be flexibly arranged at the end of SD/SDIO cards, the setup/hold time issues caused by signal delay are mostly solved through accurately controlling the chip internal delay, thus resulting in a number of limitations. Therefore, to solve this problem, it is necessary to propose technical means that will enable the configurability of trigger/sampling points in SD/SDIO host controllers.

SUMMARY OF THE INVENTION

In order to solve the problem encountered by the prior art, the main purpose of the present invention is to provide an SD/SDIO host controller which is capable of solving the setup/hold time issues caused by delay in digital signals and preventing phase deviation generated from a chip internal delay or a delay in the circuit of the test board.

To achieve the above objective, as well as others, the present invention provides an SD/SDIO host controller which at least includes a control register and interrupt generation module, an internal DMA module, an SD/SDIO command interface module and an SD/SDIO data interface module, and in addition, the SD/SDIO host controller further includes a frequency divider and trigger/sampling enable signal generation module which is connected to an output end of the control register and interrupt generation module, the frequency divider and trigger/sampling enable signal generation module employing a frequency divider to perform frequency division on a local high-speed clock to obtain an operating clock of an SD/SDIO card, and simultaneously generating an enable signal for triggering/sampling data by the frequency divider, the frequency divider and trigger/sampling enable signal generation module outputting the enable signal to the SD/SDIO command interface module and the SD/SDIO data interface module and configuring the enable signal to be adjustable in position with respect to the operating clock of the SD/SDIO card.

According to a preferred embodiment, the frequency divider and trigger/sampling enable signal generation module determines possible positions of the enable signal according to a frequency division factor of the frequency divider.

According to a preferred embodiment, the frequency divider and trigger/sampling enable signal generation module limits a maximum number of possible positions of the enable signal.

According to a preferred embodiment, the frequency divider and trigger/sampling enable signal generation module limits the maximum number of possible positions of the enable signal to 8.

According to a preferred embodiment, the frequency divider has a frequency division factor N which is an even number (including zero) within the interval of [0, 256].

According to a preferred embodiment, the enable signal has 4 possible positions at most.

According to a preferred embodiment, the SD/SDIO host controller further includes a data transmit buffer and a data receive buffer.

Compared with the prior art, the SD/SDIO host controller of the present invention employs a frequency divider to perform frequency division on a local high-speed clock so as to obtain the operating clock of the SD/SDIO card, and simultaneously generates a trigger/sampling enable signal by the frequency divider and enables the position of the enable signal to be adjustable with respect to the operating clock of the SD/SDIO card. In this way, the setup/hold time issues caused by delay in digital signals can be solved through adjusting the position of the enable signal to extend Tset or Thold.

DETAILED DESCRIPTION

The present invention will be described and specified below with reference to specific exemplary examples in combination with accompanying drawings. Other advantages and effects of the present invention will be easily understood by those skilled in this art based on the disclosure contained in the specification. The present invention is applicable to other embodiments or of being practiced or carried out in various ways, and variations and modifications may be made in details of the specification on the condition of different views and applications without departing from the spirit of the invention.

Figure 1:
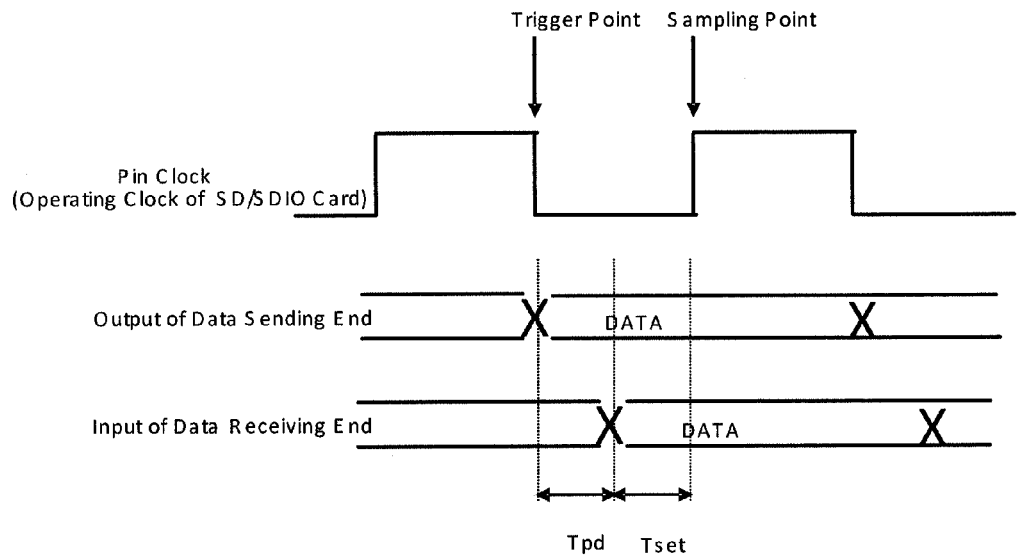
FIG. 1 is a timing diagram illustrating a scenario of the prior art in which there is a forward delay in data signal against the sampling clock.
Figure 2:
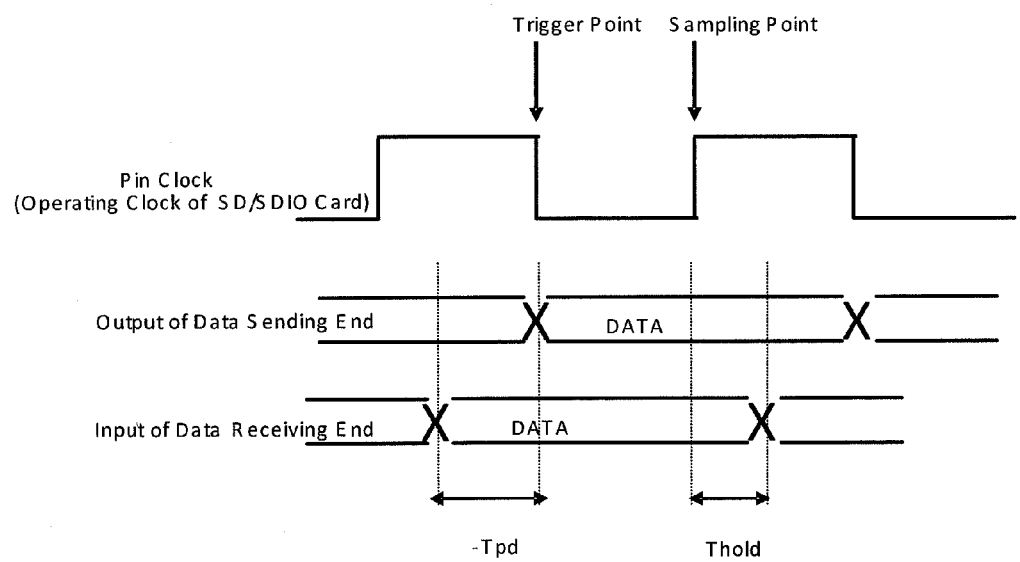
FIG. 2 is a timing diagram illustrating a scenario of the prior art in which there is a backward delay in data signal against the sampling clock.
Figure 3:
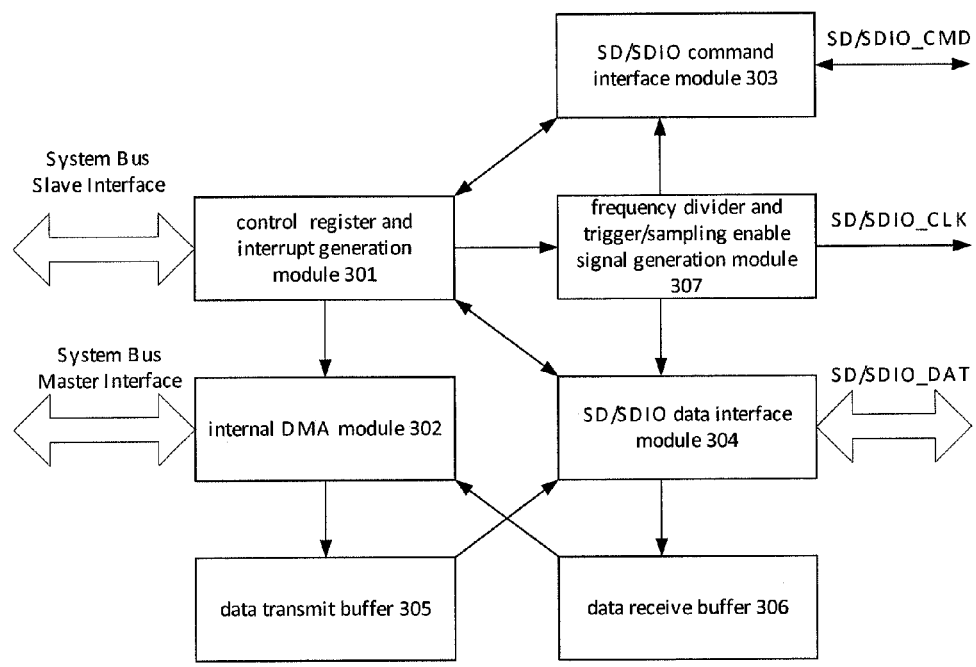
FIG. 3 is a block diagram illustrating the architecture of an SD/SDIO host controller in a preferred embodiment of the present invention.

FIG. 3 is a block diagram illustrating the architecture of an SD/SDIO host controller in a preferred embodiment of the present invention. Referring to FIG. 3, the SD/SDIO host controller of the present invention includes a control register and interrupt generation module 301, an internal DMA module 302, an SD/SDIO command interface module 303, an SD/SDIO data interface module 304, a data transmit buffer 305, a data receive buffer 306 and a frequency divider and trigger/sampling enable signal generation module 307, among which the control register and interrupt generation module 301, the internal DMA module 302, the SD/SDIO command interface module 303, the SD/SDIO data interface module 304, the data transmit buffer 305 and the data receive buffer 306 are all those also included in an SD/SDIO host controller of the prior art, and will not be specified herein. Emphasis will be given to the description on the frequency divider and trigger/sampling enable signal generation module 307 below.

The frequency divider and trigger/sampling enable signal generation module 307 is connected to an output end of the control register and interrupt generation module 301. It employs a frequency divider to perform frequency division on a local high-speed clock to obtain the operating clock SD/SDIO_CLK of the SD/SDIO card, and at the same time, it also generates an enable signal strobe_en for triggering/sampling data by the frequency divider. The frequency divider and trigger/sampling enable signal generation module 307 outputs the enable signal strobe_en to the SD/SDIO command interface module 303 and the SD/SDIO data interface module 304, and configures the enable signal strobe_en to be adjustable in position with respect to the operating clock of the SD/SDIO card.

Figure 4:
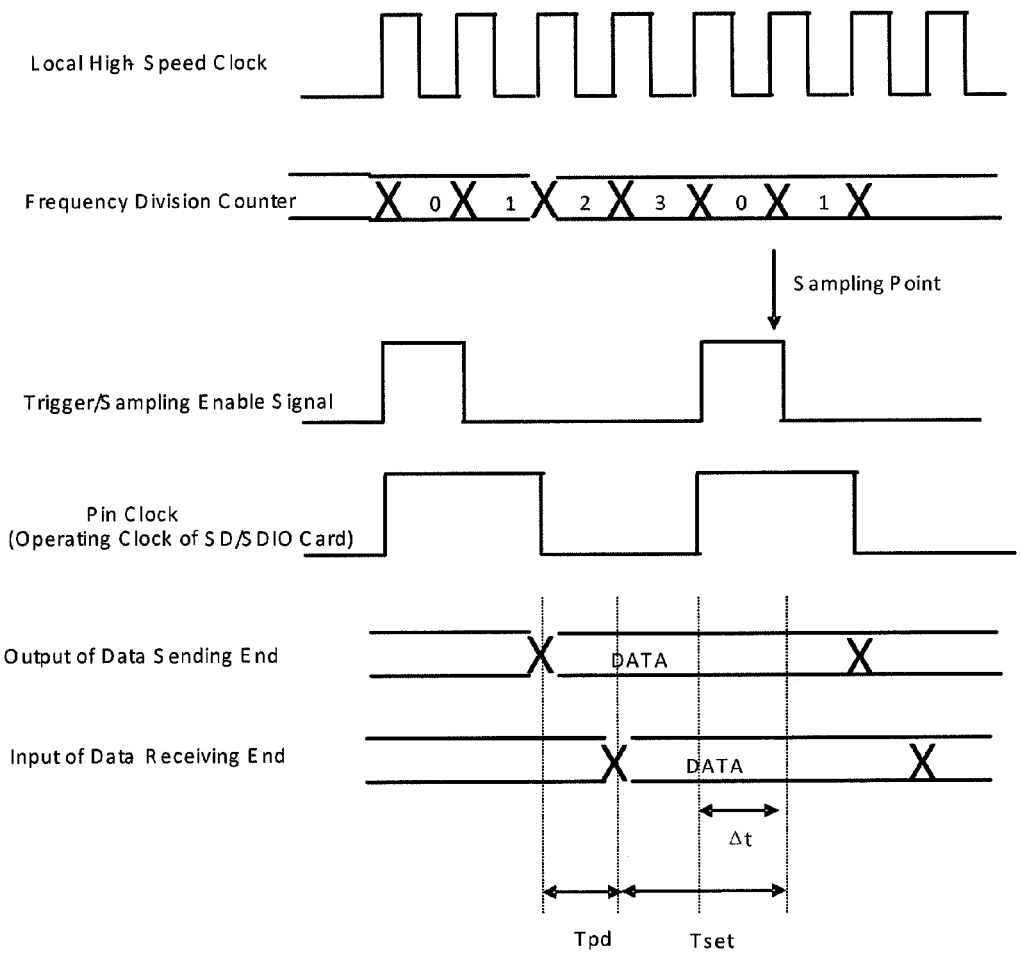
FIG. 4 is a timing diagram illustrating the operation of the SD/SDIO host controller in the preferred embodiment of the present invention.

FIG. 4 is a timing diagram illustrating the operation of the SD/SDIO host controller in the preferred embodiment of the present invention. According to FIG. 4, it is clear that through adjusting the position of the enable signal strobe_en, Tset or Thold, namely, the portion of Δt shown in FIG. 4, can be extended, and thereby the setup/hold time issues caused by time delay in digital signals can be solved.

In this preferred embodiment of the present invention, there are two ways to generate the enable signal strobe_en for triggering/sampling data, including:

1) Determining possible positions of the enable signal strobe_en according to a frequency division factor N of the frequency divider. It is obvious that the number of possible positions of the enable signal strobe_en is equal to the value of the frequency division factor N; as a result, although this method is capable of achieving a maximum flexibility, its implementation could be very complex.

2) Limiting a maximum number of possible positions of the enable signal to, for example 8, such that, when the frequency division factor N is less than or equal to 8, the number of possible positions will be equal to N; on the other hand, when the frequency division factor N is greater than 8, the number of possible positions will still be equal to 8, and the 8 positions are preferably evenly distributed within the interval of N.

According to practical experience, a greater frequency division factor N will always lead to a smaller frequency of the operating clock of the SD/SDIO card, and thus the time delay in digital signals will have less impact on the setup/hold time. Therefore, through a balance between the implementation complexity and the practicality, the best way to carry out the invention in this preferred embodiment is provided as follows:

a) the frequency division factor N is selected as an even number (including zero) within the interval of [0, 256]; and b) the maximum number of possible positions of the enable signal strobe_en is 4, i.e., when N is less than or equal to 4, the number of possible positions is N; and when N is greater than 4, the number of possible positions is 4.

Figure 5:
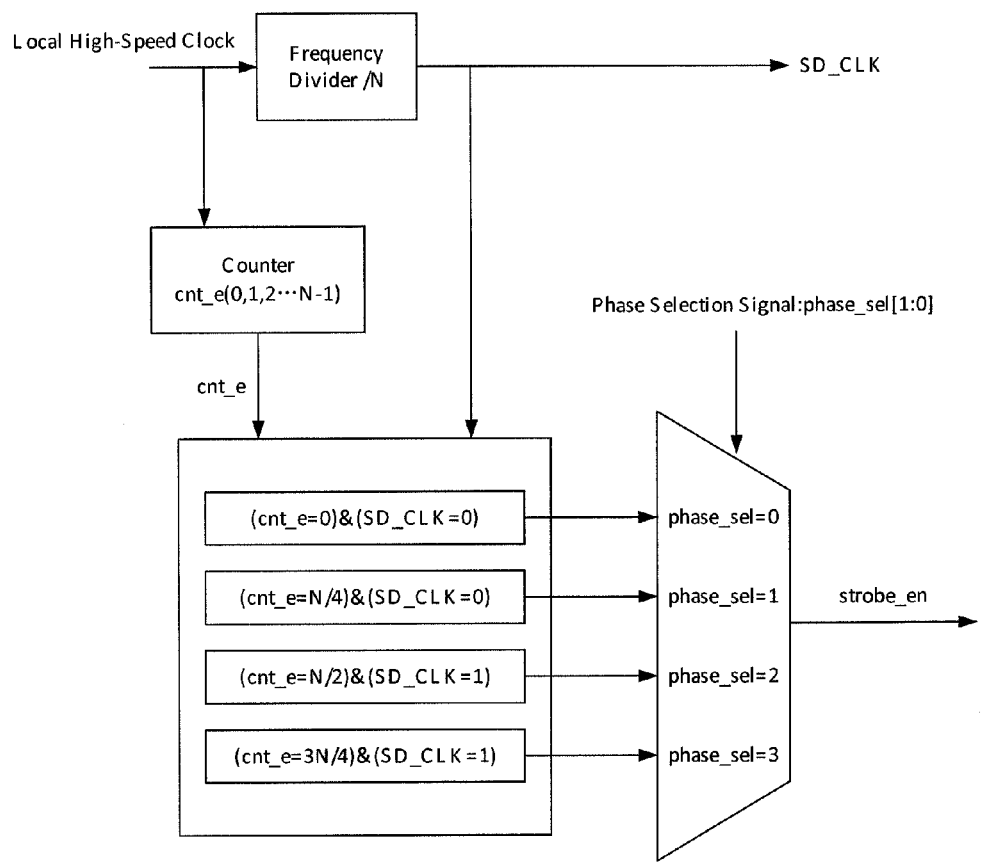
FIG. 5 is a block diagram illustrating the implementation of the trigger/sampling enable signal in a preferred embodiment of the present invention.

FIG. 5 is a block diagram illustrating the implementation of the trigger/sampling enable signal in a preferred embodiment of the present invention, in which after a frequency divider which has a frequency division factor of N performs frequency division on a local high-speed clock, the operating clock SD_CLK of the SD/SDIO card is obtained. At the same time, with judgments on both the count cnt_e of a frequency division counter and the operating clock SD_CLK of the SD/SDIO card, different phase selection signals phase_sel, and hence different possible positions of the enable signal strobe_en, will be obtained.

According to the above description, the SD/SDIO host controller of the present invention employs a frequency divider to perform frequency division on a local high-speed clock so as to obtain the operating clock of the SD/SDIO card, and simultaneously generates a trigger/sampling enable signal by the frequency divider and enables the position of the enable signal to be adjustable with respect to the operating clock of the SD/SDIO card. In this way, the setup/hold time issues caused by delay in digital signals can be solved through adjusting the position of the enable signal to extend Tset or Thold. In the present invention, the whole circuit adopts a completely synchronous logic design, and all the data to be sent/received are triggered/sampled by the local high-speed clock. Since the trigger/sampling position can be flexibly controlled, phase deviation generated from the chip internal delay or the circuit delay of the test board can be prevented.

Numerous embodiments with great variations can be made without departing from the spirit and scope of the invention. It will be understood that specific embodiments described in the specification shall not be intended to limit the scope of the invention which shall solely be limited by the appended claims.

What is claimed is:

1. An SD/SDIO host controller comprising a control register and interrupt generation module, an internal DMA module, an SD/SDIO command interface module and an SD/SDIO data interface module, wherein the SD/SDIO command interface module and the SD/SDIO data interface module operate on a local high-speed clock and the SD/SDIO host controller further comprises a frequency divider and trigger/sampling enable signal generation module connected to an output end of the control register and interrupt generation module, the frequency divider and trigger/sampling enable signal generation module employing, a frequency divider having a frequency division factor of N to perform frequency division on the local high-speed clock to obtain an operating clock of an SD/SDIO card, where N is an even number within the interval of 0 to 256 and the local high-speed clock is directly outputted as the operating clock of the SD/SDIO card when N is zero, the frequency divider and trigger/sampling enable signal generation module also generating an enable signal for triggering/sampling data by the frequency divider, the frequency divider and trigger/sampling enable signal generation module outputting the enable signal to the SD/SDIO command interface module and the SD/SDIO data interface module, the enable signal having N possible positions with respect to the operating clock of the SD/SDIO card.

2. The SD/SDIO host controller according to claim 1, wherein the frequency divider and trigger/sampling enable signal generation module limits a maximum number of possible positions of the enable signal.

3. The SD/SDIO host controller according to claim 2, wherein the frequency divider and trigger/sampling enable signal generation module limits the maximum number of possible positions of the enable signal to 8.

4. The SD/SDIO host controller according to claim 3, wherein the enable signal has 4 possible positions at most.

5. The SD/SDIO host controller according to claim 1, further comprising a data transmit buffer and a data receive buffer.

6. The SD/SDIO host controller according to claim 1, wherein the local high-speed clock is not involved in any logical operation to ensure testability and reliability of the SD/SDIO host controller.

\* \* \* \* \*

UNITED STATES PATENT AND TRADEMARK OFFICE
CERTIFICATE OF CORRECTION

PATENT NO. : 8,775,693 B2  
APPLICATION NO. : 13/597201  
DATED : July 8, 2014  
INVENTOR(S) : Yuchi Zheng and Jinxiang Chen Page 1 of 1

It is certified that error appears in the above-identified patent and that said Letters Patent is hereby corrected as shown below:

In the Claims,

Column 4, Claim 1, line 67, please delete "employing, a" and insert --employing a--.

Signed and Sealed this
Twenty-fourth Day of February, 2015

Michelle K. Lee
*Deputy Director of the United States Patent and Trademark Office*